United States Patent [19]

Gelfand

[11] E Re. 30,480

[45] Reissued Jan. 13, 1981

[54] ELECTRIC FIELD DIRECTED CONTROL OF DUST IN ELECTROSTATIC PRECIPITATORS

[75] Inventor: Peter C. Gelfand, Lebanon, Pa.

[73] Assignee: Envirotech Corporation, Menlo Park, Calif.

[21] Appl. No.: 781,897

[22] Filed: Mar. 28, 1977

Related U.S. Patent Documents

Reissue of:

[64] Patent No.: 3,719,031
Issued: Mar. 6, 1973
Appl. No.: 151,005
Filed: Jun. 8, 1971

[51] Int. Cl.[2] ..... B03C 3/00

[52] U.S. Cl. ..... 55/136; 55/147; 55/148; 55/151; 55/152

[58] Field of Search ..... 55/136, 151, 152, 154, 55/153

[56] References Cited

U.S. PATENT DOCUMENTS

| | | | |
|---|---|---|---|
| 617,618 | 1/1899 | Thwaite | 55/152 |
| 1,381,660 | 6/1921 | Rathbun | 55/154 |
| 1,888,606 | 11/1932 | Nesbit | 55/129 |
| 2,506,996 | 5/1950 | Crowder | 55/148 |
| 3,124,437 | 3/1964 | Lagarias | 55/152 |

FOREIGN PATENT DOCUMENTS

| | | | |
|---|---|---|---|
| 442876 | 4/1927 | Fed. Rep. of Germany | 55/136 |

*Primary Examiner*—Bernard Nozick
*Attorney, Agent, or Firm*—Hal J. Bohner; Robert E. Krebs

[57] ABSTRACT

In an electrostatic precipitator, a downwardly directed corona discharge is produced at the entrance to dust collecting hoppers attached at the bottom of the precipitator chamber, the corona discharge being produced by an array of corona discharge points connected to a high voltage source and a grounded electrode grid positioned below the corona points near the hopper entrance either in the hopper or in the chamber.

3 Claims, 5 Drawing Figures

ELECTRIC FIELD DIRECTED CONTROL OF DUST IN ELECTROSTATIC PRECIPITATORS

Matter enclosed in heavy brackets [ ] appears in the original patent but forms no part of this reissue specification; matter printed in italics indicates the additions made by reissue.

BACKGROUND OF THE INVENTION

This invention relates to electrostatic precipitators used in removing dust particles suspended in air or other gases.

Many types of precipitators have been developed including those that involve single stage ionization and collection, i.e., the Cottrell type, where the dust particles are collected in the same electric field in which they are ionized or charged. Although the invention has special applicability to the single-stage precipitators, it can be used effectively with other types, such as those that charge the particles in one field and collect them in another.

In the Cottrell type precipitator, the dust-laden gas is introduced into a main flow chamber at a relatively high velocity and passed through one or more banks of emitting and collecting electrodes which extend substantially vertically through the chamber. Each emitting electrode is a wire charged to a relatively high DC voltage. An electric field is thereby set up between the emitting and collecting electrodes so that the dust particles are charged with the same polarity as the emitting electrodes, causing the particles to be collected on the collecting electrodes, which are platelike in shape. The collecting electrodes are vibrated or rapped periodically, and the collected dust particles fall by gravity through openings at the bottom of the chamber leading to collecting hoppers or bins.

Because of the mounting public demand for cleaner air, modern air pollution control equipment must be able to operate at high efficiency rates. Specifications calling for the removal upwards of 99 percent of the dirt contained in air discharged into the atmosphere are not uncommon. It has been found that electrostatic precipitators are capable of operating at these high levels.

One popular usage of electrostatic precipitators is in large industrial plants where the collecting electrodes are normally 30 feet in length and longer. To maintain their high efficiency, the particles attracted to the collecting electrodes must first be efficiently conveyed into the hoppers at the bottom of the flow chamber. In addition, little or none of the dust particles in the hoppers should be re-entrained in the rapidly flowing stram of gas. Many designs have been suggested and tried, with varying degrees of success. In order to provide the high efficiency desired in these precipitators such designs have included the use of baffles or specially designed electrodes to control gas flow, lower gas velocity, higher electric charges, variations in the techniques of rapping or vibrating the collecting electrodes, and different types of electrical energization. However, such modifications involved primarily directing the gas flow through the precipitator chamber or facilitating the gravitational transfer of dust particles from the collecting electrodes downwardly toward the bottom of the chamber.

One problem, to which this invention is directed and which has not been overcome in the past, is preventing re-entrainment of dust that has been collected in the hopper or carried by gas near its entrance.

SUMMARY OF THE INVENTION

There is provided, in accordance with the invention, an electrostatic precipitator in which a downwardly directed corona discharge is produced in the lower portion of the precipitator chamber in the direction of the hoppers, the discharge occuring between the lowermost edge of the emitting electrodes and the dust collecting hoppers which communicate with the bottom of the precipitator chamber.

More specifically, an array of corona discharge points disposed along the lower portion of the precipitator chamber are adapted to be energized by a high voltage source. Preferably the discharge points are attached to weights suspended from the wires that form the emitting electrodes of the precipitator, but the corona points can be independent of those electrodes. A suitably grounded electrode configuration is positioned below the corona discharge points, adjacent each opening at the bottom of the chamber leading to the bins or hoppers, and either in the chamber or in the hoppers themselves.

When the corona points are energized, an electric field and corona discharge produced between the corona points and the grid, in the direction of the hopper, sets up a so-called electric wind in that direction that aids the gravitational force acting on the dust particles so that they will be effectively conveyed into the hopper. Moreover, once in the hoppers, the dust particles are prevented from re-entering the precipitator chamber because the electric wind counteracts the effects of the flowing gas or any sudden gusts of wind that might blow the particles up from the bottom of the hoppers.

DESCRIPTION OF THE DRAWINGS

For a better understanding of the invention, reference may be had to the following description of a preferred embodiment, taken in conjunction with the accompanying drawings in which.

DETAILED DESCRIPTION OF A PREFERRED EMBODIMENT

Figure 1:
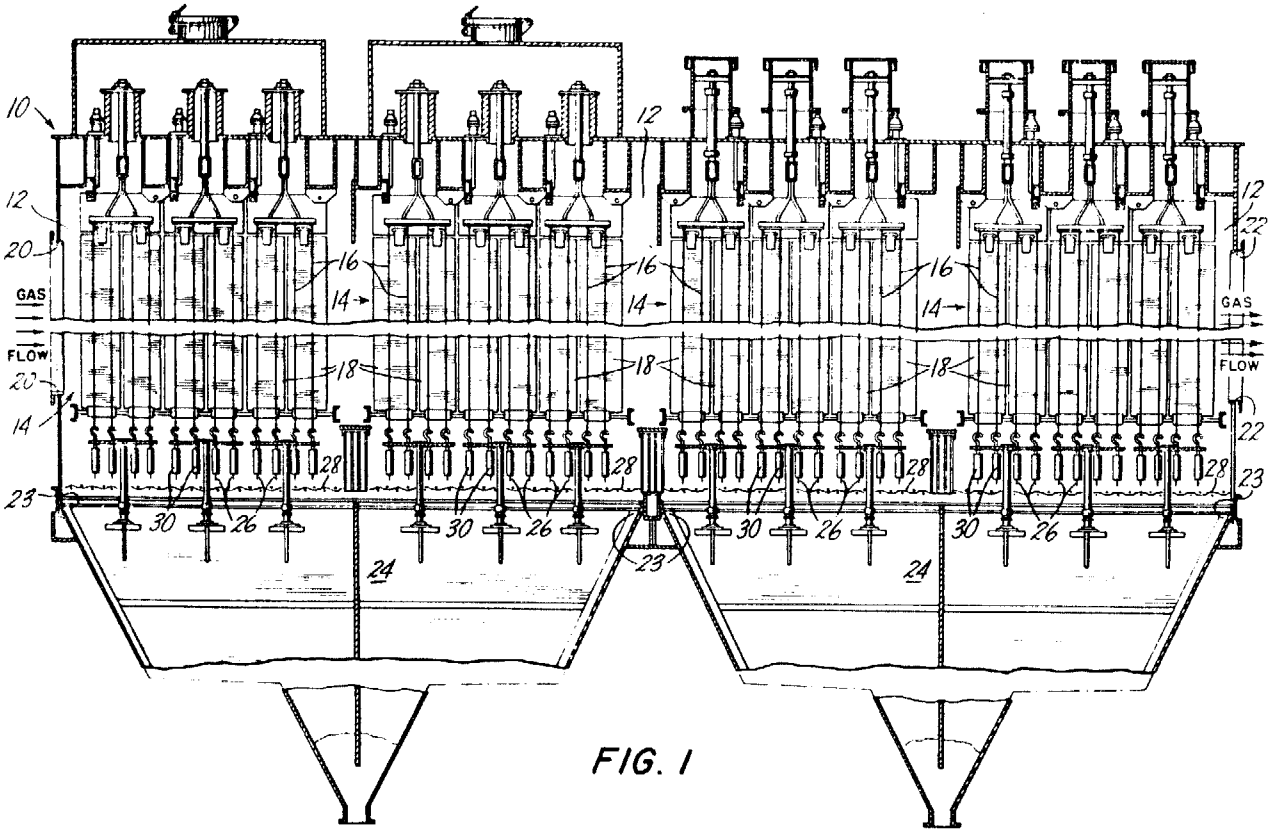
FIG. 1 is a cross-sectional view of an electrostatic precipitator equipped with corona discharge points and a grounded electrode, portions being broken away to avoid repetition.

FIG. 1 is a cross-sectional view of a Cottrell type electrostatic precipitator which has a main housing 10 that defines generally the flow chamber 12 of the precipitator. Positioned within the flow chamber 12 are a number of banks 14 of emitting electrodes 16 and collecting electrodes 18, all of which extend substantially vertically across the chamber 12. Gas containing dust particles to be removed is introduced at a relatively high velocity into the chamber 12 through an inlet opening 20 and flows past the emitting and collecting electrodes 16 and 18, the cleaned air being discharged from the chamber 12 through the outlet opening 22.

The emitter electrodes 16 are energized or charged to a high voltage, which results in an electric field and a corona discharge between the emitting and collecting electrodes 16 and 18 to charge the dust particles. The charged particles are attracted to the collecting electrodes 18 and accumulate on them. The collecting electrodes 18 are periodically rapped or vibrated so that the collected particles are dislodged and caused to fall downwardly toward the bottom of the chamber 12, through the openings 23 and into the dust collectors or hoppers 24. Because the flowing gas stream passes through the precipitator chamber 12 at such a high velocity, some of the dust particles that are dislodged from the collecting electrodes 18 and caused to fall downwardly toward the hoppers 24 will re-enter the gas stream, i.e., be re-entrained, at a lower level in the stream and thus must be collected again farther downstream.

Moreover, occasional gusts of wind directed upwardly from the hoppers 24 tend, along with the rapidly flowing stream of gas, to cause particles already in the hoppers to become re-entrained in the gas stream.

To prevent this from happening and to facilitate the gravitational movement of particles in the lower portion of the chamber 12, a corona discharge in the direction of the hoppers 24 is produced at the bottom of the chamber 12 near the openings 23 leading to the hoppers 24. The corona discharge is generated by connecting a relatively high voltage, preferably a DC voltage, between an array of corona discharge points 26 and a grounded electrode grid 28 which is positioned below the points and adjacent the openings 23 either in the flow chamber 12 or in the upper portion of the hoppers 24.

Figure 2:
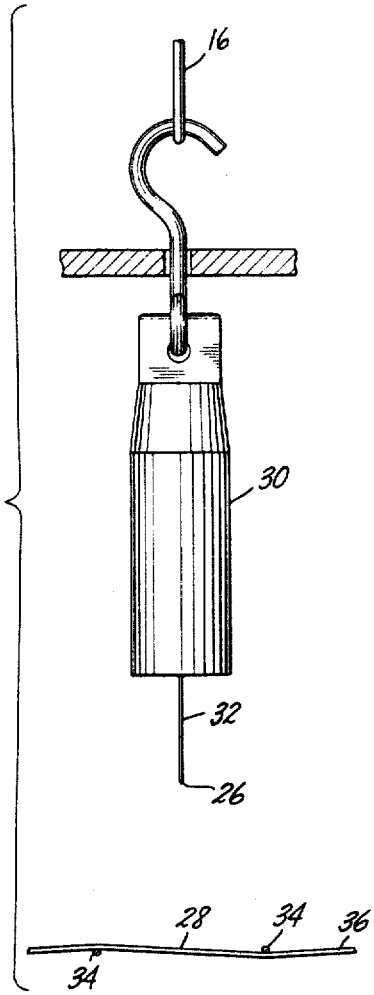
FIG. 2 is an enlarged pictorial view of one of the corona discharge points attached at the bottom of an emitting electrode and a sectional view of the grounded electrode as shown in FIG. 1.
Figure 5:
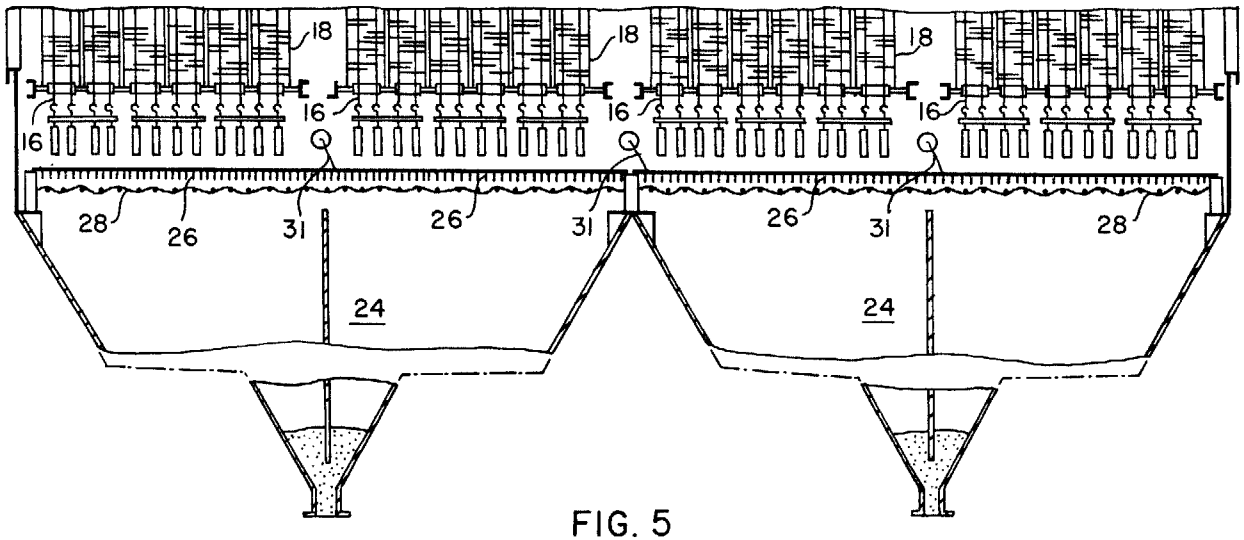
*FIG. 5 is an enlarged pictoral view of part of another embodiment of the electrostatic precipitator.*

The corona discharge points 26 can be connected to the emitting electrodes 16 and, as shown for this embodiment of the invention (see FIGS. 1 and 2), project from the bottom of weights 30 that are attached to the emitting electrodes 16 to keep them taut and prevent them from swinging out of position in the swiftly flowing gas stream. However, the discharge points 26 need not be connected to the emitting electrodes 16 and can be appropriately positioned below the emitting and collecting electrodes and connected to their own voltage [source.] *sources 31. (See FIG. 5).*

Figure 3:
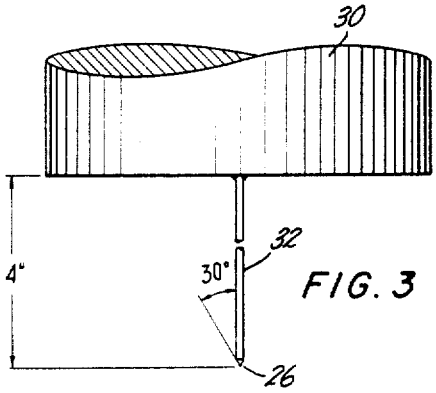
FIG. 3 is an enlarged pictorial view of a corona discharge point formed by a wire and showing in particular a preferred bevel angle of the point and a preferred length of the wire.

Each corona discharge point may be formed of a length of wire 32 extending from one of the weights 30. A wire found satisfactory for the purposes of the invention was about 4 inches in length with a radius of 1.09 inches and having its free end beveled to the discharge point 26 at about 30° from the wire axis (see FIG. 3). The wire 32 can be attached to each weight 30, for example, by threading the non-beveled end of the wire 32 and screwing it into a threaded hole formed in the bottom of the weight. The wire can also be attached by welding, soldering or other suitable methods.

When the relatively high voltage is connected to the emitting electrodes 16, the wires 32 will be energized and a corona emission will pass from the corona discharge points 26 to the grounded screen or grid 28 positioned a short distance below the corona points 26 and adjacent the openings 23, either in the chamber 12 or in the hoppers 24. This provides a downwardly directed wind to act on dust particles below the electrodes. Satisfactory results have been obtained when the electrode grid 28 is positioned between 6 to 8 inches below the corona discharge points 26.

Figure 4:
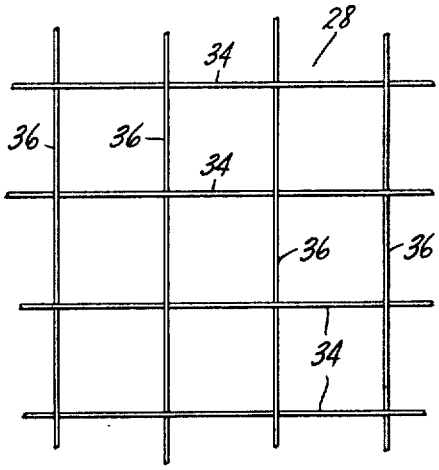
FIG. 4 is a top pictorial view of a portion of the grounded electrode.

As shown best in FIG. 4, the grid 28 can be a screen formed of two sets of conductive wires 34 and 36 with the wires in each set running parallel to each other and crossing those in the other set at right angles. Screens of other configurations and designs can also be used effectively in accordance with the invention. To avoid dust buildup on the wires 34 and 36 of the screen shown in FIG. 4, there should preferably be a distance of at least 2 inches between the wires in each set and each wire should preferably have a radius no greater than 0.5 inch.

By producing the corona discharge and electric wind adjacent the bottom of the chamber 12 in a downward direction, dust particles that fall below the electrodes will be conveyed into the hoppers 24 by both gravitational force and the electric wind, and particles already in the hoppers 24 will be prevented by the electric wind from becoming re-entrained in the gas stream flowing through the chamber 12.

Thus there is provided in accordance with the invention a novel way of increasing collection efficiencies in electrostatic precipitators. The electric wind has the advantages of facilitating the gravitational flow of dust into the hoppers and preventing dust already in the hoppers from becoming re-entrained in the flowing stream of gas. The collection efficiency of the electrostatic precipitator is greatly enhanced, so that today's strict pollution control standards can be met.

The embodiment of the invention described above is intended to be merely exemplary and those skilled in the art will be able to make numerous variations and modifications, in addition to those mentioned above, without departing from the spirit and scope of the invention. All such variations and modifications are intended to be included within the scope of the invention, as defined in the appended claims.

I claim:

[1. In an electrostatic precipitator having a housing that defines a flow chamber therein, an inlet opening for conveying a flowing stream of gas carrying dust particles into the chamber, an outlet opening located adjacent a bottom portion of the flow chamber, a dust collector hopper for receiving through a bottom opening in a chamber dust particles removed from the gas, and a plurality of emitting and collecting electrodes extending substantially vertically through the chamber across the path of gas flow, the improvement comprising means for generating a corona discharge disposed below the emitting and collecting electrodes and above the hopper, and a grounded electrode configuration disposed below the corona discharge means, the corona discharge means and electrode configuration providing a corona emission and an electric wind from said means toward the electrode configuration when said means is energized.]

[2. The improvement set forth in claim 1 wherein the corona discharge means comprises an array of corona discharge points.]

[3. The improvement set forth in claim 1 wherein each corona discharge point is electrically connected to an emitting electrode of the precipitator.]

[4. The improvement set forth in claim 3, wherein the emitting electrodes comprise wires suspended from the top portion of the chamber, a weight is attached at the bottom of each emitting electrode, and each of the corona discharge points is a length of wire connected to the bottom of each weight and projecting downwardly therefrom, each wire being pointed at its lowermost end.]

5. The improvement set forth in claim [4] *8*, wherein the length of wire forming each corona discharge point is about 4 inches long, with a radius of about 0.109 inch, and the point is beveled at about 30° from the wire axis.

[6. The improvement set forth in claim 1, wherein the electrode configuration is a screen formed of two sets of conductive wires, the wires in each set running generally parallel to each other and generally perpendicular to the wires in the other set.]

[7. The improvement set forth in claim 6, wherein the screen is disposed about 6 to 8 inches below the corona discharge means, and the distance between the wires in each set is at least about 2 inches, and the wires in each set have a radius of no greater than about 0.5 inch.]

*8. In an electrostatic precipitator having a housing that defines a flow chamber therein, an inlet opening for conveying a flowing stream of gas carrying dust particles into the chamber, an outlet opening located adjacent a bottom portion of the flow chamber, a dust collector hopper for receiving through a bottom opening in a chamber dust particles removed from the gas, and a plurality of emitting electrodes including wires suspended from the top portion of the chamber with a weight attached at the bottom of each emitting electrode, and a plurality of collecting electrodes extending substantially vertically through the chamber across the path of gas flow, the improvement comprising:*

*a. means for generating a corona discharge disposed below the emitting and collecting electrodes and above the hopper, said means for generating a corona discharge including a length of wire connected to the bottom of each weight and projecting downwardly therefrom, each wire being pointed at its lowermost end; and*

*b. a grounded electrode configuration disposed below the corona discharge means, the corona discharge means and electrode configuration providing a corona emission and an electric wind from said means toward the electrode configuration when said means is energized.*

*9. In an electrostatic precipitator having a housing that defines a flow chamber therein, an inlet opening for conveying a flowing stream of gas carrying dust particles into the chamber, an outlet opening located adjacent a bottom portion of the flow chamber, a dust collector hopper for receiving through a bottom opening in a chamber dust particles removed from the gas, and a plurality of emitting and collecting electrodes extending substantially vertically through the chamber across the path of gas flow, the improvement comprising means for generating a corona discharge disposed below the emitting and collecting electrodes and above the hopper, said means for generating a corona discharge including an array of corona discharge points electrically coupled to a voltage source independent from the emitting electrodes, and a grounded electrode configuration disposed below the corona discharge means, the corona discharge means and electrode configuration providing a corona emission and an electric wind from said means toward the electrode configuration when said means is energized.*

* * * * *